(12) United States Patent
Lin et al.

(10) Patent No.: US 11,552,323 B2
(45) Date of Patent: Jan. 10, 2023

(54) BIOFUEL CELL

(71) Applicant: National Tsing Hua University, Hsinchu (TW)

(72) Inventors: Fang-Yi Lin, Hsinchu (TW); Yao-Yu Lin, Hsinchu (TW); Chia-Chieh Hsu, Hsinchu (TW); Han-Yi Chen, Hsinchu (TW); Tzu-Yin Liu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 235 days.

(21) Appl. No.: 17/134,186

(22) Filed: Dec. 25, 2020

(65) Prior Publication Data

US 2022/0149413 A1    May 12, 2022

(30) Foreign Application Priority Data

Nov. 10, 2020 (TW) .................................. 109139119

(51) Int. Cl.
*H01M 8/16* (2006.01)
(52) U.S. Cl.
CPC ..................................... *H01M 8/16* (2013.01)
(58) Field of Classification Search
None
See application file for complete search history.

(56) References Cited

U.S. PATENT DOCUMENTS

| 2011/0180749 A1* | 7/2011 | Gotou | ................ H01M 50/409 |
| | | | 252/182.1 |
| 2017/0362719 A1* | 12/2017 | Borole | ...................... C12P 7/18 |

FOREIGN PATENT DOCUMENTS

| CN | 103972521 | 2/2018 |
| CN | 105845947 | 6/2018 |
| CN | 108862238 | 11/2018 |
| CN | 111342101 | 6/2020 |
| TW | I695540 | 6/2020 |

OTHER PUBLICATIONS

Adsorptive removal of Cr (VI) by Fe-modified activated carbon prepared from Trapa natans husk (Year: 2010).*
Shih Chao-Kuei, "Preparation and Characterization of Hydrothermal Activated Carbons derived from Shell of Trapa", Department of Materials Engineering, Kun Shan University, Jun. 2019, pp. 1-76.
"Office Action of Taiwan Counterpart Application", dated Apr. 13, 2021, pp. 1-4.
Hongying Li et al., "Power output of microbial fuel cell emphasizing interaction of anodic binder with bacteria", Journal of Power Sources, Jan. 2018, p. 115-122.

(Continued)

*Primary Examiner* — Brian R Ohara
*Assistant Examiner* — Patrick Marshall Greene
(74) *Attorney, Agent, or Firm* — JCIPRNET

(57) ABSTRACT

A biofuel cell includes a cathode, an anode, and a microbial community. At least one of the anode and the cathode contains a biochar prepared from a *Trapa natans* husk as an electrode material, and the anode is located in the microbial community. By using the biochar prepared from the *Trapa natans* husk as the electrode material, not only can the power density of the biofuel cell be increased, but the economic benefits of waste recycling can also be achieved.

11 Claims, 6 Drawing Sheets

(56) References Cited

OTHER PUBLICATIONS

Fei Li et al., "The construction of rod-like polypyrrole network on hard magnetic porous textile anodes for microbial fuel cells with ultra-high output power density", Journal of Power Sources, vol. 412, Feb. 2019, p. 514-519.

Yan-Ming Chen et al., "Application of aluminum-alloy mesh composite carbon cloth for the design of anode/cathode electrodes in *Escherichia coli* microbial fuel cell", International Journal of Hydrogen Energy, vol. 38, Issue 25, Aug. 2013, p. 11131-11137.

Yezhen Zhang et al., "A graphene modified anode to improve the performance of microbial fuel cells", Journal of Power Sources, Feb. 2011, p. 5402-5407.

Prateek Khare et al., "Carbon Nanofiber-skinned Three Dimensional Ni/Carbon Micropillars: High Performance Electrodes of a Microbial Fuel Cell", Electrochimica Acta, Sep. 2016, p. 88-98.

Tushar Sharma et al., "Development of carbon nanotubes and nanofluids based microbial fuel cell", International Journal of Hydrogen Energy, Oct. 2008, p. 6749-6754.

Georgepeter Gnana Kumar et al., "Conductive Polymer/Graphene Supported Platinum Nanoparticles as Anode Catalysts for the Extended Power Generation of Microbial Fuel Cells", Industrial & Engineering Chemistry Research, Oct. 14, 2014, p. 1-11.

Shiv Singh et al., "Candle soot-derived carbon nanoparticles: An inexpensive and efficient electrode for microbial fuel cells", Electrochimica Acta, Feb. 2018, p. 119-127.

Ali Mehdinia et al., "Facile microwave-assisted synthesized reduced graphene oxide/tin oxide nanocomposite and using as anode material of microbial fuel cell to improve power generation", International Journal of Hydrogen Energy, Jul. 2014, p. 1-7.

Xiaofen Chen et al., "Porous carbon with defined pore size as anode of microbial fuel cell", Biosensors and Bioelectronics, Jul. 2015, p. 135-41.

Ali Mehdinia et al., "Multi-walled carbon nanotube/SnO2 nanocomposite: a novel anode material for microbial fuel cells", Electrochimica Acta, Mar. 2014, p. 512-518.

G. Gnana Kumar et al., "Synthesis, Structural, and Morphological Characterizations of Reduced Graphene Oxide-Supported Polypyrrole Anode Catalysts for Improved Microbial Fuel Cell Performances", ACS Sustainable Chemistry & Engineering, Sep. 5, 2014, p. 2283-2290.

In Ho Park et al., "Enhanced electrical contact of microbes using Fe3O4/CNT nanocomposite anode in mediator-less microbial fuel cell", Biosensors and Bioelectronics, Feb. 2014, p. 75-80.

Mengjie Fan et al., "Different modified multi-walled carbon nanotube-based anodes to improve the performance of microbial fuel cells", International Journal of Hydrogen Energy, Sep. 7, 2017, p. 1-10.

Ya-Qiong Wang et al., "Novelly developed three-dimensional carbon scaffold anodes from polyacrylonitrile for microbial fuel cells", Journal of Materials Chemistry A, Jan. 21, 2015, p. 5110-5118.

Yu-Hsuan Hung et al., "Renewable Coffee Waste-Derived Porous Carbons as Anode Materials for High-Performance Sustainable Microbial Fuel Cells", ACS Sustainable Chemistry & Engineering, Aug. 7, 2019. p. 1-25.

A. Carmalin Sophia et al., "Green energy generation from plant microbial fuel cells (PMFC) using compost and a novel clay separator", Sustainable Energy Technologies and Assessments, May 10, 2017, p. 59-66.

J. MD Khudzari et al., "Effects of salinity, growing media, and photoperiod on bioelectricity production in plant microbial fuel cells with weeping alkaligrass", Biomass & Bioenergy, Feb. 2018, p. 1-9.

M.A. Moqsud et al., "Compost in plant microbial fuel cell for bioelectricity generation", Waste Management, Nov. 2014, p. 1-7.

Vinh Nguyen et al., "Bioelectricity Generation in Plant Microbial Fuel Cell Using Forage Grass under Variations of Circadian Rhythm, Ambient Temperature, and Soil Water Contents", 2019 IEEE Asia Power and Energy Engineering Conference (APEEC), May 23, 2019, p. 240-244.

Koen Wetser et al., "Electricity generation by a plant microbial fuel cell with an integrated oxygen reducing biocathode", Applied Energy, Jan. 2015, p. 151-157.

M. Helder et al., "New plant-growth medium for increased power output of the Plant-Microbial Fuel Cell", Bioresource Technology, Jan. 2012, p. 417-423.

Ruud A. Timmers et al., "Long-term performance of a plant microbial fuel cell with Spartina anglica", Applied Microbiology and Biotechnology, Feb. 2, 2010, p. 973-981.

María Guadalupe Salinas-Juárez et al., "Plant and microorganisms support media for electricity generation in biological fuel cells with living hydrophytes", Bioelectrochemistry, Dec. 2016, p. 1-27.

Lu Lu et al., "Microbial community structure accompanied with electricity production in a constructed wetland plant microbial fuel cell", Bioresource Technology, Nov. 2015, p. 1-7.

Shentan Liu et al., "Power Generation Enhancement by Utilizing Plant Photosynthate in Microbial Fuel Cell Coupled Constructed Wetland System", International Journal of Photoenergy, Oct. 13, 2013, p. 1-11.

Natalia F. Tapia et al., "Evaluation of Sedum as driver for plant microbial fuel cells in a semi-arid green roof ecosystem", Ecological Engineering, Aug. 2017, p. 203-210.

Yolina Hubenova et al., "Conversion of solar energy into electricity by using duckweed in Direct Photosynthetic Plant Fuel Cell", Bioelectrochemistry, Mar. 13, 2012, p. 185-191.

Pranab Jyoti Sarma et al., "Epipremnum aureum and Dracaena braunii as indoor plants for enhanced bio-electricity generation in a plant microbial fuel cell with electrochemically modified carbon fiber brush anode", Journal of Bioscience and Bioengineering, Sep. 2018, p. 1-7.

\* cited by examiner

BIOFUEL CELL

CROSS-REFERENCE TO RELATED APPLICATION

This application claims the priority benefit of Taiwanese application serial no. 109139119, filed on Nov. 10, 2020. The entirety of the above-mentioned patent application is hereby incorporated by reference herein and made a part of this specification.

BACKGROUND OF THE INVENTION

Field of the Invention

The invention relates to a biofuel cell, and particularly relates to a biofuel cell using a biochar prepared from a waste *Trapa natans* husk as an electrode material.

Description of Related Art

A biofuel cell is a battery system that uses organisms (such as natural bacteria, etc.) to cause electrochemical reactions. Particularly in the crisis of increasingly scarce energy, the biofuel cell has become an emerging battery.

The biofuel cell has developed into various types of battery systems, such as a microbial fuel cell (MFC) and a plant microbial fuel cell (PMFC).

A microbial fuel cell mainly converts chemical energy into electrical energy using an organic matter in the metabolic environment of a microbial community. For example, the metabolic reaction of *Escherichia coli* (*E. coli*) attached to the anode terminal with organic matter may produce carbon dioxide, protons, and electrons, wherein the electrons are transmitted to the anode terminal via an external circuit to form a current, and the electrons and the protons reach the cathode terminal to be combined with oxygen to form water. The reaction formulas are as follows:

Anode: $C_6H_{12}O_6 + 6H_2O \rightarrow 6CO_2 + 24H^+ + 24e^-$ 

Cathode: $4H^+ + 4e^- + O_2 \rightarrow 2H_2O$ 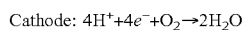

A plant microbial fuel cell generates electrons as energy sources resulting from the interaction between the roots of plants grown in the soil and the microorganisms nearby. Specifically, the nutrients produced by plants during photosynthesis are released into the soil via the roots of the plants. Therefore, the microbial community located around the roots produce electrons, carbon dioxide, and protons in the reaction of decomposing sugar-containing nutrients, wherein the electrons are transferred to the anode terminal via an external circuit to form a current, and the electrons and the protons are combined with oxygen upon reaching the cathode terminal to form water. The reaction formula is shown in the previous paragraph.

The above biofuel cells generally have the issue of low output power, and in order to increase power density, expensive materials are often used.

SUMMARY OF THE INVENTION

The invention provides a biofuel cell that not only improves the power density of the biofuel cell, but also achieves the economic benefits of waste recycling.

The biofuel cell of the invention includes an anode, a cathode, and a microbial community. At least one of the anode and the cathode contains a biochar prepared from a waste *Trapa natans* husk as an electrode material, and the anode is located in the microbial community.

In an embodiment of the invention, the biofuel cell may be a microbial fuel cell.

In an embodiment of the invention, the microbial community is attached to a surface of the anode.

In an embodiment of the invention, a specific surface area of the biochar may be 200 m²/g or more.

In an embodiment of the invention, the microbial fuel cell may further include a proton exchange membrane disposed between the anode and the cathode and adjacent to the anode.

In an embodiment of the invention, the biofuel cell may be a plant microbial fuel cell.

In an embodiment of the invention, the biofuel cell may further include a soil housed in a container and a plant planted in the soil, wherein the microbial community exists in the soil, and the anode is disposed around a root of the plant.

In an embodiment of the invention, a water may also be added to the container to make a water surface higher than the soil, so that the cathode is disposed at a junction of the soil and the water.

In an embodiment of the invention, a specific surface area of the biochar is 200 m²/g or more.

In an embodiment of the invention, the anode is the biochar and the cathode is an activated carbon.

In an embodiment of the invention, a total volume of a micropore of the biochar is greater than a total volume of a mesopore, wherein the micropore refers to a pore having a pore size less than 2 nm, and the mesopore refers to a pore having a pore size between 2 nm and 50 nm.

Based on the above, the biofuel cell of the invention uses a biochar prepared from a *Trapa natans* husk as an electrode material, and if waste *Trapa natans* husk is used as a raw material, the cost is low, the economic benefits of waste recycling may be achieved, and the biofuel cell of the invention is environmentally friendly. Moreover, it is found through experiments that the biochar prepared by the *Trapa natans* husk may significantly increase the power density of the biofuel cell. Moreover, when the biochar applied to a plant microbial fuel cell, a fertilizer is not needed (the fertilizer may be a solid fertilizer or a liquid fertilizer) to generate electricity for a long time, thus achieving the prospect of being a sustainable energy.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following, exemplary embodiments of the invention are comprehensively described with reference to figures, but the invention may also be implemented in various different forms and should not be construed as limited to the embodiments of the specification. In the figures, for clarity, the size and the thickness of each area, part, and layer are not drawn according to actual scale. For example, microorganisms are usually not visually observed, but in order to show the distribution position of the microorganisms, they are exaggeratedly enlarged and presented in the figures.

Figure 1:
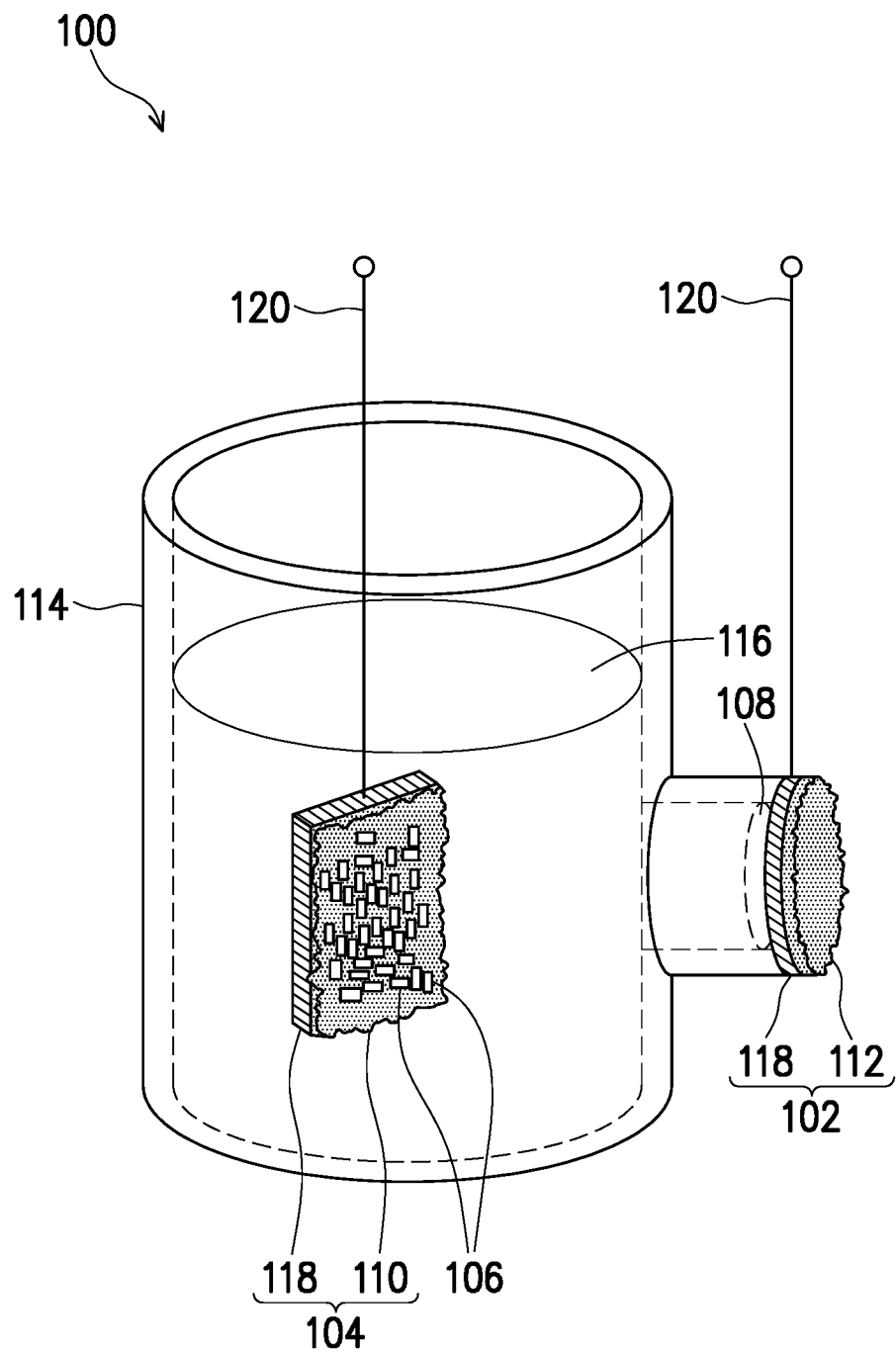
FIG. 1 is a diagram of a biofuel cell according to the first embodiment of the invention.

FIG. 1 is a diagram of a biofuel cell according to the first embodiment of the invention.

Referring to FIG. 1, the biofuel cell of the present embodiment, such as a microbial fuel cell 100, includes a cathode 102, an anode 104, and a microbial community 106. In addition, a proton exchange membrane 108 is disposed between the cathode 102 and the anode 104 and is adjacent to the cathode 102. However, the invention is not limited thereto; in another embodiment of the microbial fuel cell, the proton exchange membrane 108 may be omitted. At least one of the cathode 102 and the anode 104 contains a biochar 110 prepared from a *Trapa natans* husk as an electrode material. In the present embodiment, the anode 104 contains the biochar 110 prepared from a waste *Trapa natans* husk; and the cathode 102 adopts an activated carbon 112, such as a carbon nanotube, a commercial activated carbon, or activated carbon prepared from other recycled wastes.

In an embodiment, the method of fabricating the biochar 110 is, for example, fabricating the biochar 110 into activated carbon using a physical activation method or a chemical activation method. For example, after the waste *Trapa natans* husk is collected, washed, and primarily ground, a physical activation method (such as a water vapor activation method or a carbon dioxide activation method) or a chemical activation method (such as using a pore-forming agent) is selected for activation. The pore-forming agent (also referred to as an activator) is, for example, potassium hydroxide (KOH), zinc chloride ($ZnCl_2$), or sodium hydroxide (NaOH) or the like. The weight ratio of the waste *Trapa natans* husk to the pore-forming agent may be between 1:1 and 1:10, and the carbonization temperature is, for example, 600° C. to 1000° C. Then, after carbonization, secondary grinding may be performed, and processes such as pickling, washing, drying, and sieving may be performed in order to obtain the biochar 110. The carbon material prepared according to the above method has high surface area (for example, the specific surface area is 200 $m^2/g$ or more, preferably 1000 $m^2/g$ or more, more preferably 1700 $m^2/g$ or more), a porous structure, and good electrical conductivity. It is found through experiments that the total volume of the micropore of the biochar 110 is greater than the total volume of the mesopore, wherein the micropore refers to a pore having a pore size less than 2 nm, and the mesopore refers to a pore having a pore size between 2 nm and 50 nm. The total volume of the macropore of the biochar 110 is 0.5% or less of the total volume of all the pores (i.e., macropore, mesopore, and micropore), and is preferably close to 0, wherein the macropore refers to a pore having a pore size greater than 50 nm.

Please continue to refer to FIG. 1. The microbial community 106 is located between the cathode 102 and the anode 104, and the anode 104 is located in the microbial community 106. Preferably, the microbial community 106 is attached to the surface of the anode 104. The microbial community 106 may be applied to a variety of single microbial systems, such as *E. coli, Shewanella putrefaciens*, etc., or a diverse microbial system in wastewater sludge. In addition, usually a container 114 is used to load a liquid 116 containing a microbial community and an organic matter or a solid containing an organic matter, so that the microbial community in the liquid 116 is adsorbed on the surface of the anode 104, and the organic matter in the liquid 116 may be reacted with the microbial community 106. In addition, the cathode 102 and the anode 104 usually have a conductive plate 118, so that the activated carbon 112 and the biochar 110 are respectively coated on the conductive plate 118. The conductive plate 118 is, for example, carbon cloth, graphite felt, carbon felt, graphite paper, carbon paper, graphite brush, carbon brush, stainless steel mesh, or nickel foam.

In FIG. 1, the microbial community 106 attached to the surface of the biochar 110 undergoes a metabolic reaction with the organic matter in the liquid 116 to release carbon dioxide, protons, and electrons, wherein the electrons are transferred to the cathode 102 via an external circuit 120 to form a current and is supplied to an external device (not shown), and the protons reach the cathode 102 via the proton exchange membrane 108. The electrons and the protons are combined with external oxygen at the cathode 102 to form water. Experiments confirm that the power density of the microbial fuel cell 100 of the present embodiment may be as high as 5000 mW $m^{-2}$ or more. Therefore, in the invention, waste *Trapa natans* husk may be recycled as the electrode material of the microbial fuel cell 100, thus not only achieving the effects of environmental friendliness and waste recycling, but also achieving better power generation performance than a traditional anode prepared by activated carbon. Therefore, the invention is an important development application for sustainable energy and meets the key points of circular economy.

Figure 2:
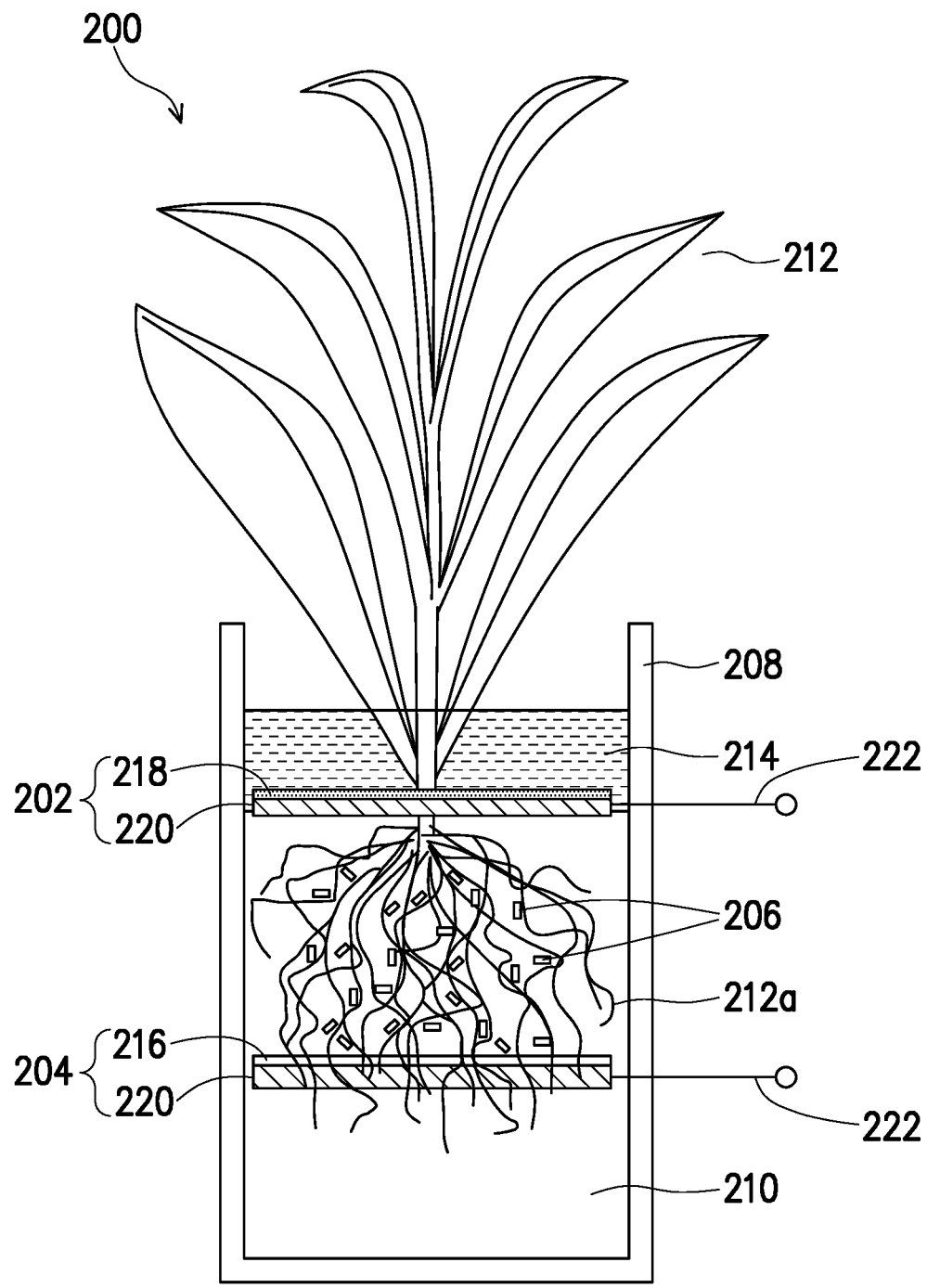
FIG. 2 is a diagram of a biofuel cell according to the second embodiment of the invention.

FIG. 2 is a diagram of a biofuel cell according to the second embodiment of the invention.

Referring to FIG. 2, the biofuel cell of the present embodiment, such as a plant microbial fuel cell 200, includes a cathode 202, an anode 204, a microbial community 206, a soil 210 placed in a container 208, and a plant 212 planted in the soil 210. The microbial community 206 generally exists in the soil 210. In the present embodiment, more water 214 may be added to the container 208 to make the water surface higher than the soil 210, so that the cathode 202 is disposed at the junction of the soil 210 and the water 214, and the anode 204 is disposed around a root 212a of the plant 212. At least one of the cathode 202 and the anode 204 contains a biochar 216 prepared from a *Trapa natans* husk as an electrode material. In the present embodiment, the anode 204 contains the biochar 216 prepared from a waste *Trapa natans* husk; and the cathode 202 adopts an activated carbon 218, such as a carbon nanotube, a commercial activated carbon, or activated carbon prepared from other recycled wastes.

In an embodiment, the method of fabricating the biochar 216 is, for example, after the waste *Trapa natans* husk is collected, washed, and ground, the waste *Trapa natans* husk is directly fabricated into a carbon material by high-temperature carbonization. After the carbonization, the waste *Trapa natans* husk may be ground again, and then processes such as pickling, washing, drying, and sieving are performed in order to obtain the biochar 216. The specific surface area of the carbon material prepared according to the above method is about 200 $m^2/g$ or more. In another embodiment, the biochar 216 is as provided in the method of fabricating the biochar (110) in an embodiment to fabricate a porous carbon material having a high surface area (for example, a specific surface area of 1000 $m^2/g$ or more).

Referring further to FIG. 2, the cathode 202 and the anode 204 usually both have a conductive plate 220, wherein the conductive plate 220 is, for example, carbon cloth, graphite felt, carbon felt, graphite paper, carbon paper, graphite brush, carbon brush, stainless steel mesh, or nickel foam. The activated carbon 218 and the biochar 216 are respectively coated on the conductive plate 220. For example, the activated carbon 218 is coated on a side in contact with the water 214, and the biochar 216 is coated on a side facing the cathode 202. However, the invention is not limited thereto; the activated carbon 218 and the biochar 216 may also be coated on all surfaces of each of the conductive plates 220. In addition, in the present embodiment, the cathode 202 and the anode 204 may be connected to an external device (not shown) via a metal conductive line 222, wherein the metal conductive line 222 is, for example, a copper line, an aluminum line, a silver line, a gold line, a titanium line, etc.

In FIG. 2, the nutrients of the plant 212 produced by photosynthesis are released into the soil 210 via the root 212a of the plant 212, the microbial community 206 located around the root 212a generates electrons in the reaction of decomposing sugar-containing nutrients, and current is collected by the cathode 202 and the anode 204 and sent to an external device (such as an energy storage equipment). Experiments confirm that the plant microbial fuel cell 200 of the present embodiment has a high power density and is a self-charging device.

Experimental examples are described below to verify the efficacy of the invention. However, the invention is not limited to the following content.

Preparation Example 1

After a waste *Trapa natans* husk was washed and primarily ground, zinc chloride ($ZnCl_2$) was used as a pore-forming agent, and the weight ratio of the waste *Trapa natans* husk to the pore-forming agent was set to 1:1 and the mixture was activated for 24 hours. Next, carbonization was performed in a nitrogen atmosphere at 600° C. Then, after the carbonization, secondary grinding could be performed, and processes such as pickling, washing, drying, and sieving could be performed in order to obtain a biochar.

Preparation Example 2

A biochar was fabricated in the same way as in Preparation example 1, but the carbonization temperature was changed from 600° C. to 800° C.

Preparation Example 3

A biochar was fabricated in the same way as in Preparation example 1, but the carbonization temperature was changed from 600° C. to 1000° C.

<BET Analysis>

The surface structures of the biochars of Preparation examples 1 to 3 and commercial activated carbon (CAC) were analyzed, and Table 1 below was obtained.

TABLE 1

| | $S_{BET}$ ($m^2/g$) | Average pore size (nm) | $V_{micro}$ ($cm^3/g$) | $V_{meso}$ ($cm^3/g$) | $V_{macro}$ ($cm^3/g$) | $V_{total}$ ($cm^3/g$) |
|---|---|---|---|---|---|---|
| CAC | 832.0 | 2.41 | 0.27574 (58.3%) | 0.19458 (41.2%) | 0.00246 (0.5%) | 0.47278 |
| Preparation example 1 | 1372.1 | 2.16 | 0.35848 (49.0%) | 0.37323 (51.0%) | 0.0001 | 0.73181 |
| Preparation example 2 | 1748.8 | 2.05 | 0.63728 (71.9%) | 0.24895 (28.1%) | 0.00009 | 0.88632 |
| Preparation example 3 | 2527.9 | 2.18 | 0.78934 (58.7%) | 0.54795 (40.8%) | 0.00629 (0.5%) | 1.34358 |

$V_{macro}$ refers to total macropore volume.
$V_{meso}$ refers to total mesopore volume.
$V_{micro}$ refers to total micropore volume.
$V_{total}$ refers to the total volume of micropore, mesopore, and macropore.

It may be obtained from Table 1 that the biochars of Preparation examples 1 to 3 had much larger specific surface areas than CAC, and the total pore volumes thereof were also larger.

Experimental Example 1

First, CAC, a conductive additive (carbon black), and a binder (polyvinylidene fluoride (PVDF)) were mixed into a slurry at a weight ratio of 8:1:1 (stirring for one day), then the slurry was coated on a carbon cloth having a working area of 1×1 $cm^2$ as the cathode. The cathode was bonded with a Nafion proton exchange membrane by hot pressing.

Next, the biochar of Preparation example 1, a conductive aid (carbon black), and a binder (PVDF) were mixed into a slurry at a weight ratio of 8:1:1 (stirring for one day), and then the slurry was coated on a carbon cloth having a working area of 1×1 $cm^2$ as the anode and cultivated together with *E. coli* DH5a, so that the bacterial colony was attached to the surface thereof.

Then, the resulting cathode, the proton exchange membrane, and the anode were assembled into the microbial fuel cell shown in FIG. 1, wherein a lysogeny broth (LB) was used as an organic matter, and the bacterial liquid volume was 40 ml.

Experimental Example 2

A microbial fuel cell was fabricated in the same manner as in Experimental example 1, and the anode of Preparation example 1 was changed to the anode of Preparation example 2.

Experimental Example 3

A microbial fuel cell was fabricated in the same manner as in Experimental example 1, and the anode of Preparation example 1 was changed to the anode of Preparation example 3.

Comparative Example 1

A microbial fuel cell was fabricated in the same manner as in Experimental example 1, but the anode of Preparation example 1 was changed to an electrode material containing CAC, similarly to the cathode.

<Cell Efficiency Analysis>

Figure 3:
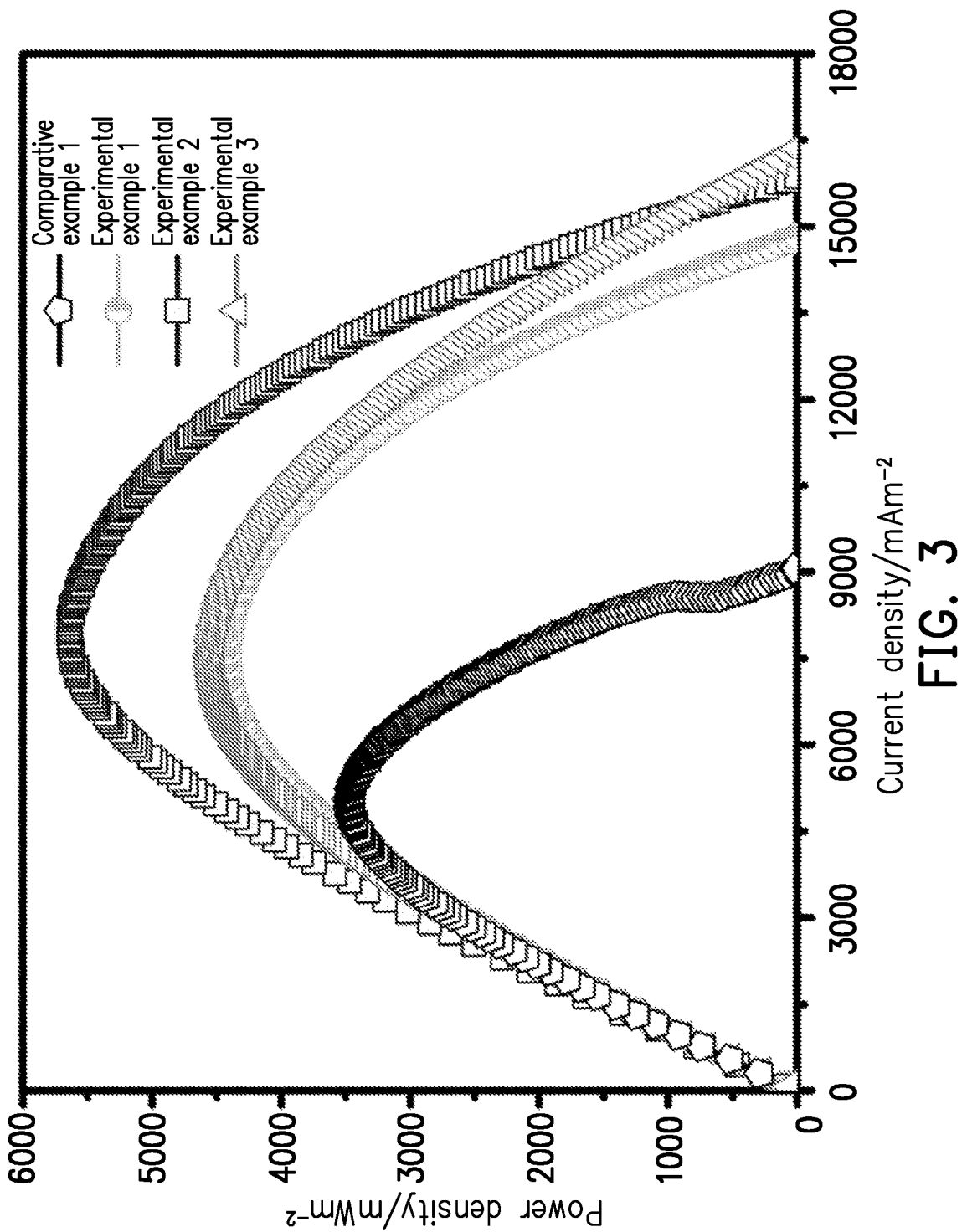
FIG. 3 is a graph of current density and power density of the microbial fuel cells of Experimental examples 1 to 3 and Comparative example 1.

Linear sweep voltammetry (LSV) analysis was performed on the microbial fuel cells of Experimental examples 1 to 3 and Comparative example 1 respectively to first obtain the open circuit voltage and the current density of the microbial fuel cells, and then calculation was performed according to the above values to obtain the current density and power density graphs of FIG. 3.

From FIG. 3, it may be obtained that the power densities of Experimental examples 1 to 3 were all greater than the power density of the microbial fuel cell using CAC as the electrode material. In addition, the microbial fuel cell of Experimental example 2 had the highest power density (5639.5 mW m$^{-2}$), presumably because the microbial fuel cell of Experimental example 2 adopted an anode having a high total micropore volume ratio (71.9%) (Preparation example 2).

Experimental Example 4

A biochar was used as the electrode material of the cathode, and the values obtained by surface structure analysis were: $S_{BET}$ of 200.76 m$^2$/g, average pore size of 2.29 nm, $V_{macro}$ of 0.00097 m$^2$/g, $V_{meso}$ of 0.01195 m$^2$/g, $V_{micro}$ of 0.088 m$^2$/g, and $V_{total}$ of 0.10092 m$^2$/g. Then, the biochar, a conductive additive (carbon black), and a binder (PVDF) were mixed into a slurry at a weight ratio of 8:1:1 (stirring for one day), then the slurry was coated on a graphite felt having a working area of 12×12 cm$^2$ as the anode.

Moreover, CAC, a conductive additive (carbon black), and a binder (PVDF) were mixed into a slurry at a weight ratio of 8:1:1 (stirring for one day), then the slurry was coated on a graphite felt having a working area of 12×12 cm$^2$ as the cathode.

Figure 4:
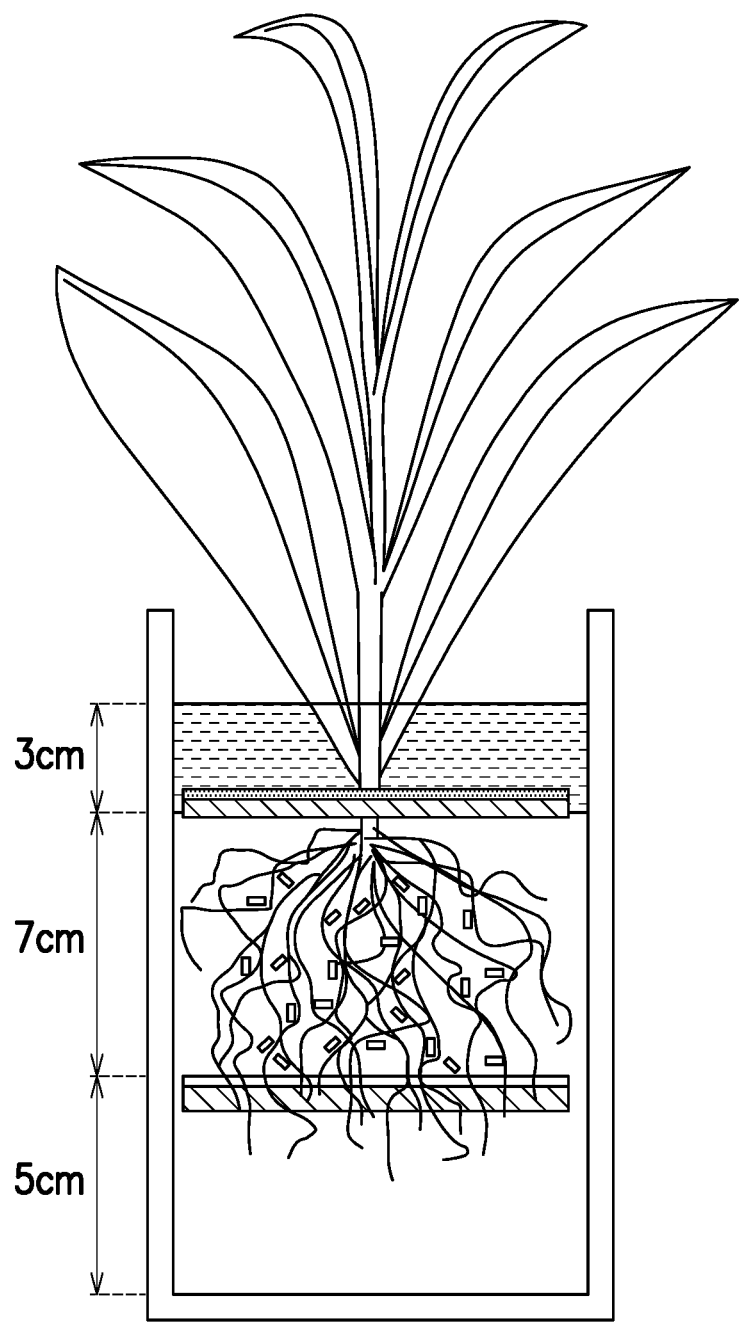
FIG. 4 is a diagram of the plant microbial fuel cell of Experimental example 4.

Then, *Canna indica* was grown in wetland soil with tap water and configured into a microbial fuel cell as shown in FIG. 4, wherein the height of the container was 20 cm and the bottom area thereof was 16.8×16.8 cm$^2$. The anode (biochar facing up) was disposed in the wetland soil adjacent to the root of the *Canna indica*, and the cathode (CAC facing up) was disposed at the interface between the wetland soil and the tap water. The anode was about 5 cm away from the bottom of the container, the distance between the anode and the cathode was about 7 cm, and the water surface of the tap water was 3 cm above the cathode. In addition, a conductive line (not shown) braided with a titanium line was provided on the uncoated surface of the anode and the cathode to electrically couple a measuring equipment to the anode and the cathode.

Comparative Example 2

The same microbial fuel cell as in FIG. 4 was used, but only graphite felt was used for the anode and the cathode, and CAC and biochar were not coated.

<Cell Efficiency Analysis>

The voltage drop measurement of the plant microbial fuel cells of Experimental example 4 and Comparative example 2 using series resistance is as follows.

First, an external resistance (R) was connected in series with the above plant microbial fuel cells in order from large to small (5000Ω to 100Ω), the load voltage of the external resistance of each serial connection was measured after every half an hour, and then the circuit was opened for one hour, then the above steps were repeated.

The resulting voltage was measured and current density was obtained by "I=V/(R*geometric area of electrode)". Then, power density was obtained according to "power density=square of voltage/(R*geometric area of electrode)". The data obtained in the above manner is shown in FIG. 5.

Figure 5:
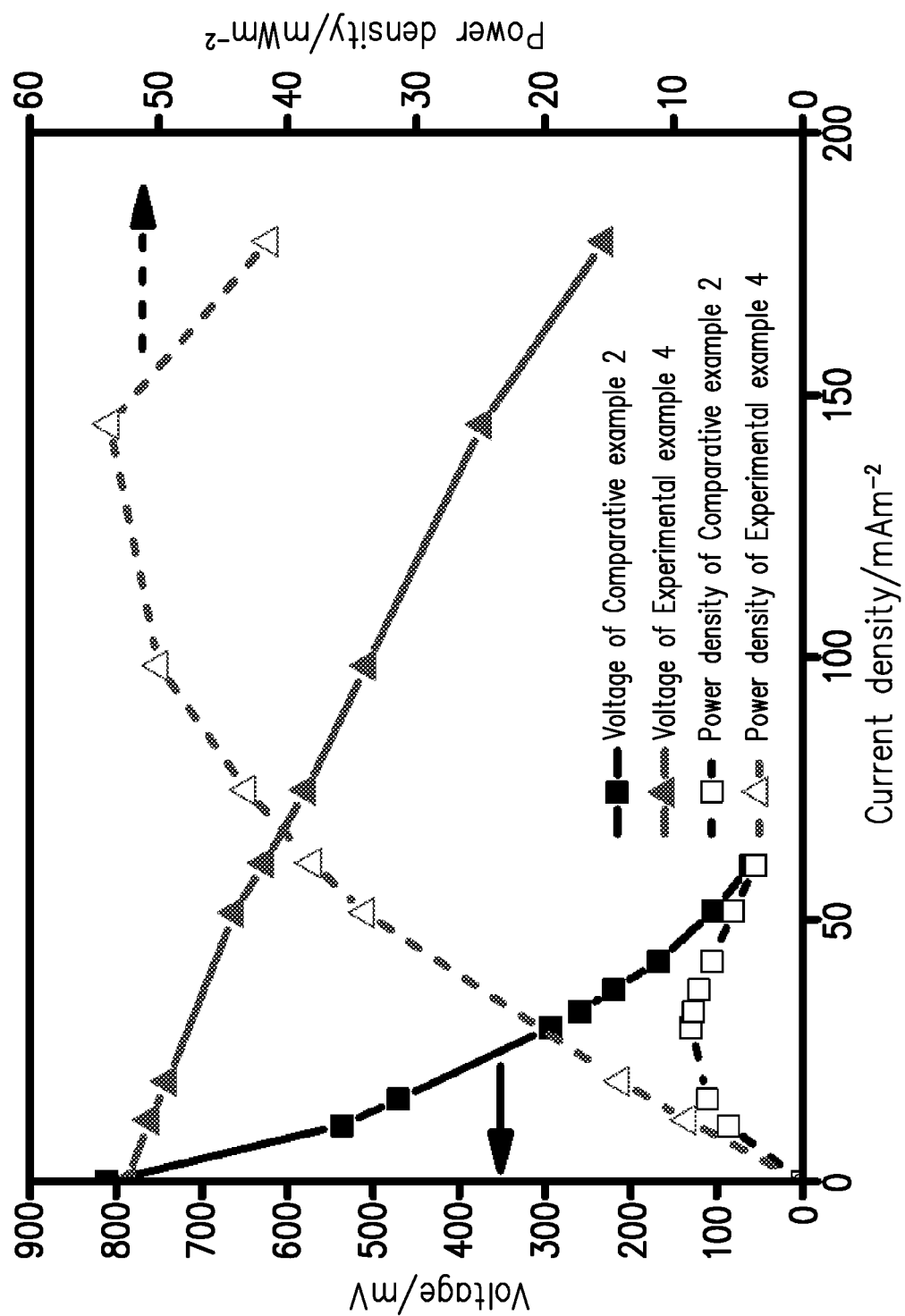
FIG. 5 is a graph of current density and voltage/power density of the plant microbial fuel cells of Experimental example 4 and Comparative example 2.

It may be obtained from FIG. 5 that the power density of Experimental example 4 was greater than the power density of Comparative example 2.

<Long-Term Testing>

Figure 6:
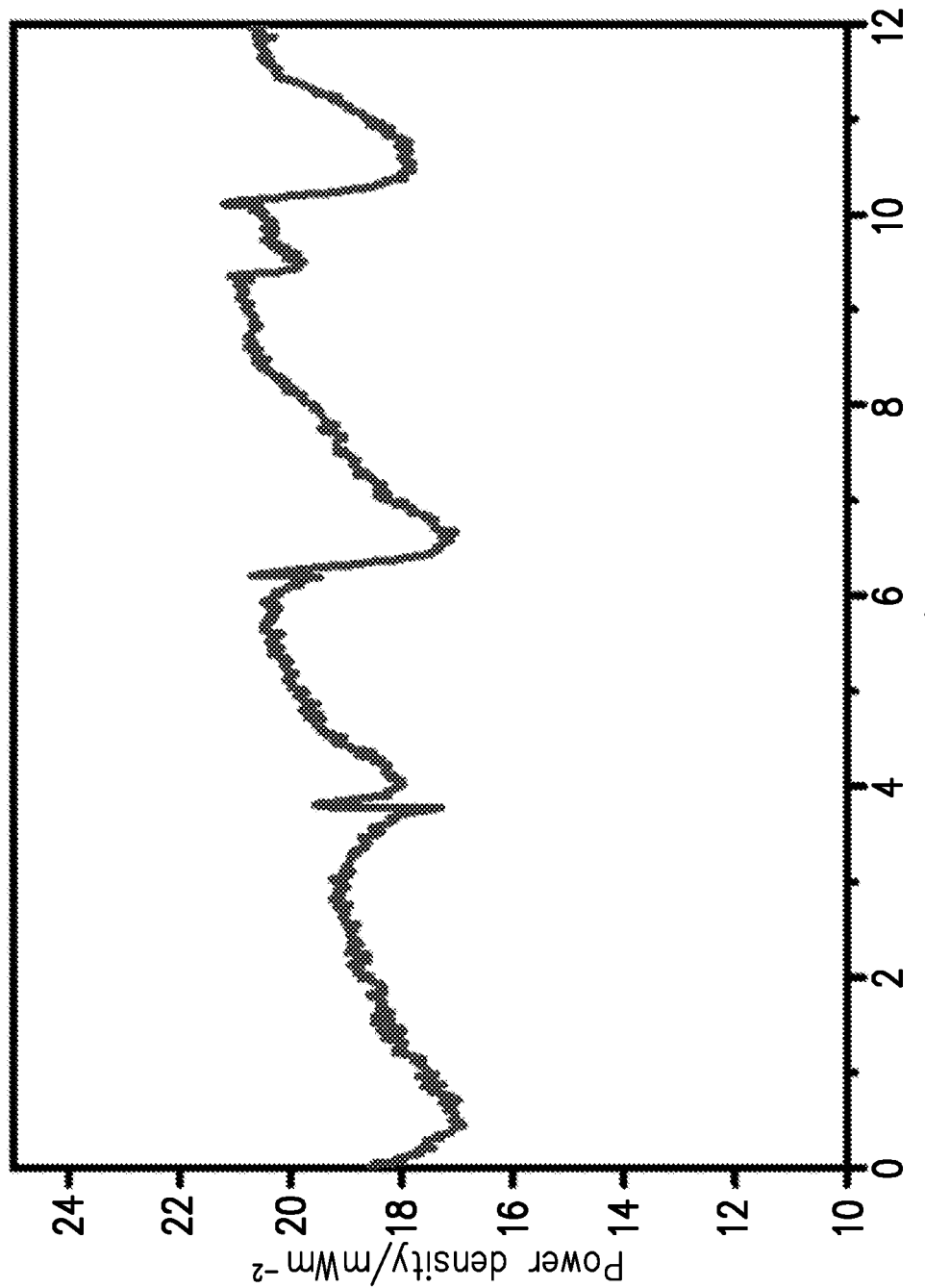
FIG. 6 is a graph of the power density of the plant microbial fuel cell of Experimental example 4 after long-term testing.

The maximum power density of the plant microbial fuel cell of Experimental example 4 was tested for a long time under an external resistance of 1000Ω, and the result is shown in FIG. 6.

It may be seen from FIG. 6 that the highest voltage on the 10th day could reach 523 mV, and the power density was about 21.2 mW m$^{-2}$, thus indicating a self-charging device.

Based on the above, in the invention, a biochar prepared from a waste *Trapa natans* husk is used as the electrode material, so the raw material cost is low, the economic benefits of waste recycling may be achieved, and the biochar is environmentally friendly. Moreover, experiments have found that whether the biochar prepared from a waste *Trapa natans* husk is used in a microbial fuel cell or a plant microbial fuel cell, the power density of the biofuel cell may be significantly increased. In addition, when applied to a plant microbial fuel cell, electricity may be generated for a long time for the prospect of being a sustainable energy source.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A biofuel cell, comprising:
   a microbial community;
   a cathode; and
   an anode, wherein at least one of the anode and the cathode contains a biochar prepared from a waste *Trapa natans* husk as an electrode material, and the anode is located in the microbial community.

2. The biofuel cell of claim 1, wherein the biofuel cell is a microbial fuel cell.

3. The biofuel cell of claim 2, wherein the microbial community is attached to a surface of the anode.

4. The biofuel cell of claim 2, wherein a specific surface area of the biochar is 200 m$^2$/g or more.

5. The biofuel cell of claim 2, further comprising a proton exchange membrane disposed between the anode and the cathode and adjacent to the cathode.

6. The biofuel cell of claim 1, wherein the biofuel cell is a plant microbial fuel cell.

7. The biofuel cell of claim 6, further comprising:
   a soil housed in a container, wherein the microbial community exists in the soil; and
   a plant planted in the soil, wherein the anode is disposed around a root of the plant.

8. The biofuel cell of claim 7, further comprising adding a water above the soil to make a water surface higher than the soil, so that the cathode is disposed at a junction of the soil and the water.

9. The biofuel cell of claim 6, wherein a specific surface area of the biochar is 200 m$^2$/g or more.

10. The biofuel cell of claim 1, wherein the cathode is an activated carbon, and the anode is the biochar.

11. The biofuel cell of claim 1, wherein a total volume of a micropore of the biochar is greater than a total volume of a mesopore of the biochar, the micropore refers to a pore having a pore size less than 2 nm, and the mesopore refers to a pore having a pore size between 2 nm and 50 nm.

\* \* \* \* \*